May 7, 1946.  W. W. ROACH ET AL  2,399,827
CATALYST CHAMBER
Filed April 12, 1943
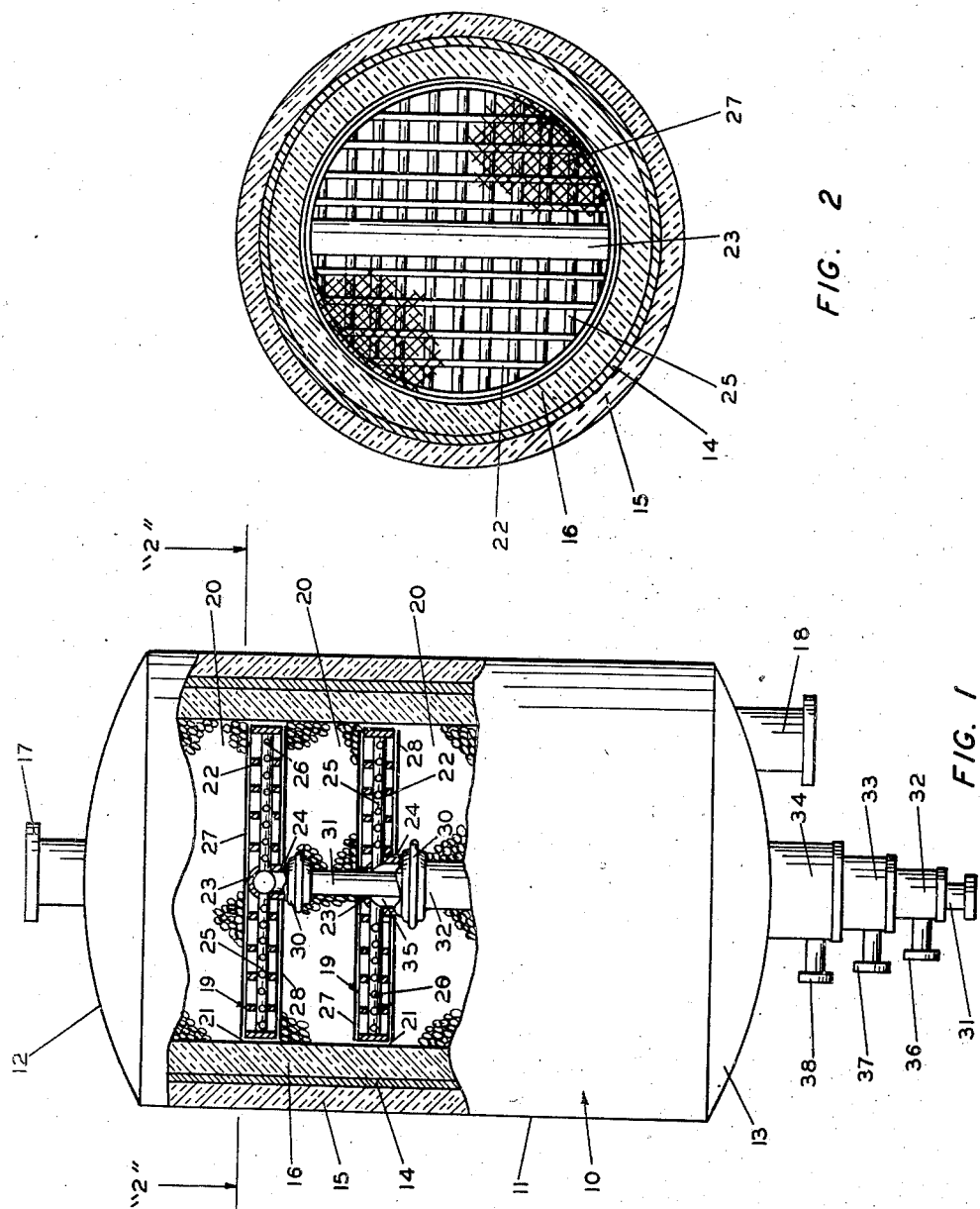
INVENTORS.
W. W. ROACH
D. G. BLAKER
BY
Hudson, Young & Yunger
ATTORNEYS.

Patented May 7, 1946

2,399,827

UNITED STATES PATENT OFFICE 2,399,827

CATALYST CHAMBER

Wendell W. Roach, Kansas City, Mo., and David G. Blaker, Mission, Kans., assignors to Phillips Petroleum Company, a corporation of Delaware Application April 12, 1943, Serial No. 482,808

4 Claims. (Cl. 23—288)

This invention relates to a catalyst chamber of the class employed in carrying out hydrocarbon conversions in the presence of solid catalytic materials. In its more specific aspects the present invention is concerned with catalyst chambers of the character indicated wherein a simplified conduit arrangement is provided for transmitting fluid materials into a plurality of beds of solid catalyst that are disposed one above the other within the chamber.

Experience has demonstrated that catalyst vessels may be advantageously employed in the catalytic conversion of hydrocarbon oils, especially in the cracking of said oils, to facilitate direct heat transfer and temperature control within the mass of solid catalysts employed. Thus in the catalytic conversion of hydrocarbon oils, it is usually desirable to supply heat to vapors of said oils undergoing treatment during the conversion period and to remove heat employed in the course of exothermic reactivation of the catalyst by combustion of the carbon deposited thereon.

The catalyst chambers that have been employed heretofore have generally consisted of a closed metal shell properly insulated and having an inlet in its upper end and an outlet in its lower end, the hydrocarbon oils to be treated being introduced into the chamber through the inlet and the conversion products being discharged from the chamber through the outlet; a plurality of spaced perforate hollow partitions disposed across the interior of the chamber with a bed of solid catalyst material in the space intermediate adjacent partitions, and a conduit for each partition communicating with the exterior of the chamber through corresponding individual openings in the side wall of the chamber. These conduits are employed for the purpose of transmitting a heat carrier, such as steam, into the beds of catalyst during the hydrocarbon conversion cycle. They are also used to introduce diluent and air into the catalyst beds when the same are being reactivated in the course of the regeneration cycle.

Among the outstanding features of our invention is a simplified conduit arrangement communicating with each partition and the exterior of the chamber. Instead of providing a separate opening through the side wall of the chamber to accommodate a corresponding conduit, as has been the practice in the past, our invention teaches the utilization of a single opening in the chamber through which fluid material may be readily and independently conveyed to the various partitions. As will be observed from the detailed description appearing further along, this feature basically comprises the use of a plurality of concentric conduits that communicate with corresponding partition arrangements.

This invention has for its primary object the provision of an improved catalyst chamber adapted to be advantageously employed in the conversion of hydrocarbons and in the reactivation of the catalyst in an efficient and effective manner.

One of the important objects of this invention is to provide a simplified conduit arrangement for supplying diluent and/or other fluid materials to the catalyst beds of a catalyst chamber.

Another object of the invention is the provision of apparatus of the character indicated which is simple in design, rugged in construction, and reasonable in initial, operating and maintenance costs.

These, as well as additional objects and advantages, will be readily apparent to persons skilled in the art by reference to the following description and annexed drawing, which respectively describe and illustrate a preferred embodiment of the invention; and wherein Figure 1 is an elevation view of the catalyst chamber of the present invention shown partly in central cross section; and Figure 2 is a plan view taken through line 2—2 of Figure 1.

Referring first to Figure 1 of the drawing, we have denoted therein a catalyst chamber, generally indicated by reference numeral 10, and including a vertical cylindrical side wall 11, a top wall 12, and a bottom wall 13. The walls of chamber 10 are preferably fabricated from sheet or plate metal 14 of requisite thickness and composition to properly withstand the conditions encountered in the course of normal operation. The outer surface of the metal chamber is provided with a covering of insulation 15 that may be of the asbestos type whereas the inner surface carries a suitable sheath of refractory insulation 16. The hydrocarbon feed stock to be processed within chamber 10 is preferably introduced thereinto through an inlet 17, and the conversion products are discharged from the chamber by way of an outlet 18.

As will be noted from an inspection of Figures 1 and 2, a plurality of spaced circular hollow partitions 19 is positioned across the interior of the chamber. These partitions divide the interior of the chamber into a series of compartments, each of which is filled with a bed of solid catalyst material 20, as indicated, of selected size and composition. Partitions 19 are somewhat smaller in overall diameter than the internal diameter of the chamber, thereby providing a clearance space 21 to permit the passage of catalyst material from one compartment to the next adjacent compartment and to allow for vertical movement of the individual partitions within the chamber. Each partition includes a grating 22 within which there is a hollow spider arrangement consisting of a header 23 having an inlet 24 and a plurality of distribution conduits 25, each of which is provided with a series of ports 26. Metal screens 27 and 28 form the upper and lower surfaces, respectively, of each partition. These screens are co-extensive with the top and bottom of the partitions and have a mesh of such size as to permit the passage of fluid material therethrough, but preventing the passage of catalyst material from an upper partition to the next lower partition and vice versa. A flexible conduit connection such as a bellows 30 is connected to each inlet 24 to allow relative movement between corresponding partitions and conduits that are more fully described below.

A plurality of substantially concentric conduits 31, 32, 33, and 34 project upwardly through bottom wall 13 and into the interior of the chamber. Innermost conduit 31 of this group is connected to bellows 30 of the top partition, and conduit 32 is similarly connected to bellows 30 of the partition that is positioned next to the top partition. Conduits 33 and 34 likewise communicate with succeedingly lower partitions, respectively, (not shown). An annular passage 35 is formed between the outer surface of conduit 31 and the inner surface of conduit 32. A like annular passage is formed between the outer surface of conduit 32 and the inner surface of conduit 33 and between the outer surface of conduit 33 and the inner surface of conduit 34. Conduits 36, 37 and 38 communicate with the above mentioned annular passages, respectively. In the course of the hydrocarbon conversion cycle a heat carrier, such as steam, is supplied to the individual partitions and thence to the catalyst beds by means of the conduit arrangement set forth herein. During the regeneration cycle diluent and/or air may be supplied to the partitions and thence to the catalyst beds by means of said conduit arrangement.

From the foregoing, it is believed that the construction, operation, and advantages of our present invention will be readily understood by persons skilled in the art. It is to be borne in mind, however, that various changes in the apparatus may be resorted to without departing from the spirit of the invention as defined by the appended claims.

We claim:

1. In a catalyst chamber of the class described and having a fluid inlet, a fluid outlet, an opening in a wall of the chamber, and a plurality of hollow partitions disposed in substantially vertical spaced relation across the interior of the chamber thereby dividing the same into a plurality of compartments each containing solid catalyst material upon which the individual partitions are supported, said partitions being spaced from the interior wall of said chamber to permit movement thereof longitudinally of the axis of said chamber, said partitions each being perforated for permitting the flow of fluid material and for preventing the passage of solid catalyst material therethrough into and from a level thereabove and a level therebelow, and fluid spray means positioned within each partition and including a spray inlet and a plurality of spaced spray outlets, the improvement comprising a plurality of separate conduits, each of said conduits being adapted to communicate directly with only one corresponding spray inlet, said conduits being arranged substantially concentrically and spaced from each other to form annular passages with next adjacent conduits, all of said conduits being adapted to communicate with the exterior of the chamber through the opening therein.

2. The improvement in accordance with the preceding claim and including means exterior the chamber for selectively introducing fluid into individual annular passages formed by next adjacent conduits.

3. In a catalyst chamber of the class described and having a tubular side wall, a pair of end walls, a fluid inlet, a fluid outlet, and at least a pair of hollow partitions disposed in spaced relation across the interior of the side wall intermediate the end walls thereby dividing the same into a plurality of compartments each containing solid catalyst material upon which the individual partitions are supported, said partitions each being perforated for permitting the flow of fluid material and for preventing the passage of solid catalyst material therethrough into and from a level thereabove and a level therebelow and fluid spray means positioned within each partition and including a spray inlet and a plurality of spray outlets, the improvement comprising at least a pair of substantially concentric conduits extending through one end wall and spaced from each other to form an annular passage therebetween, the inner of said pair of conduits communicating directly with the spray inlet of the partition that is positioned farthest from said one end wall, the outer of said pair of conduits and said annular passage communicating directly with the spray inlet of the other of said pair of partitions, and a flexible conduit connection between each conduit and each partition to permit relative movement between corresponding conduits and partitions.

4. In a catalyst chamber of the class described and having a substantially vertical cylindrical side wall, a bottom end wall, a top end wall, a fluid inlet, a fluid outlet, and at least a pair of hollow partitions disposed in spaced relation across the interior of the side wall intermediate the end walls thereby dividing the same into a plurality of compartments each containing solid catalyst material upon which the individual partitions are supported, said partitions being spaced from the interior wall of said chamber to permit movement thereof longitudinally to the axis of said chamber, said partitions each being perforated for permitting the flow of fluid material and for preventing the passage of solid material therethrough into and from a level thereabove and a level therebelow, and fluid spray means positioned within each partition and including a spray inlet and a plurality of spray outlets, the improvement comprising at least a pair of substantially concentric conduits extending substantially vertically through the bottom end wall and spaced from each other to form an annular passage therebetween, the inner of said pair of conduits communicating directly with the spray inlet of the upper of said pair of partitions, the outer of said pair of conduits and said annular passage communicating directly with the spray inlet of other of said pair of partitions, and a flexible conduit connection between each conduit and each partition to permit relative movement between corresponding conduits and partitions.

WENDELL W. ROACH.
DAVID G. BLAKER.